(12) United States Patent
van den Oever et al.

(10) Patent No.: US 9,916,306 B2
(45) Date of Patent: Mar. 13, 2018

(54) STATISTICAL LINGUISTIC ANALYSIS OF SOURCE CONTENT

(71) Applicants: Laurens van den Oever, Vlaardingen (NL); Jason Matthew Dent, Haarlem (NL)

(72) Inventors: Laurens van den Oever, Vlaardingen (NL); Jason Matthew Dent, Haarlem (NL)

(73) Assignee: SDL INC., Wakefield, MA (US)

( * ) Notice: Subject to any disclaimer, the term of this patent is extended or adjusted under 35 U.S.C. 154(b) by 0 days.

(21) Appl. No.: 13/656,543

(22) Filed: Oct. 19, 2012

(65) Prior Publication Data

US 2014/0114642 A1    Apr. 24, 2014

(51) Int. Cl.
*G06F 17/20* (2006.01)
*G06F 17/28* (2006.01)

(52) U.S. Cl.
CPC ...... *G06F 17/2854* (2013.01); *G06F 17/2818* (2013.01); *G06F 17/2836* (2013.01); *G06F 17/20* (2013.01); *G06F 17/28* (2013.01)

(58) Field of Classification Search
CPC ................................. G06F 17/28; G06F 17/20
USPC ................ 704/1, 2, 7, 9, 232, 239, 256, 277
See application file for complete search history.

(56) References Cited

U.S. PATENT DOCUMENTS

| | | |
|---|---|---|
| D290,952 S | 7/1987 | Price |
| D291,086 S | 7/1987 | Price |
| 4,845,658 A | 7/1989 | Gifford |
| 4,916,614 A | 4/1990 | Kaji et al. |
| 4,920,499 A | 4/1990 | Skeirik |
| 5,032,979 A | 7/1991 | Hecht et al. |
| 5,351,189 A | 9/1994 | Doi et al. |
| 5,418,717 A | 5/1995 | Su et al. |
| 5,640,575 A | 6/1997 | Maruyama et al. |
| 5,677,835 A | 10/1997 | Carbonell et al. |
| 5,708,780 A | 1/1998 | Levergood et al. |
| 5,715,314 A | 2/1998 | Payne et al. |
| 5,724,424 A | 3/1998 | Gifford |
| 5,768,603 A * | 6/1998 | Brown ................ G06F 17/2755 704/232 |
| 5,812,776 A | 9/1998 | Gifford |
| 5,873,056 A | 2/1999 | Liddy et al. |
| 5,909,492 A | 6/1999 | Payne et al. |

(Continued)

FOREIGN PATENT DOCUMENTS

| | | |
|---|---|---|
| AU | 5240198 A | 5/1998 |
| AU | 694367 B2 | 7/1998 |

(Continued)

OTHER PUBLICATIONS

Invitation to Pay Additional Fees dated Mar. 26, 2014, re International Application No. PCT/EP2013/071781 filed Oct. 17, 2013.

(Continued)

*Primary Examiner* — Forrest F Tzeng
(74) *Attorney, Agent, or Firm* — Carr & Ferrell LLP

(57) ABSTRACT

Systems and method for statistical linguistic analysis. According to some embodiments, methods may include evaluating a source text using one or more types of statistical linguistic analysis to determine a translatability of the source text and providing the translatability of the source text to a client node.

20 Claims, 10 Drawing Sheets

(56) References Cited

U.S. PATENT DOCUMENTS

| | | |
|---|---|---|
| 5,974,372 A | 10/1999 | Barnes et al. |
| 6,014,628 A | 1/2000 | Kovarik, Jr. |
| 6,044,344 A | 3/2000 | Kanevsky |
| 6,049,785 A | 4/2000 | Gifford |
| 6,085,162 A | 7/2000 | Cherny |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer, Jr. et al. |
| 6,279,112 B1 | 8/2001 | OToole, Jr. et al. |
| 6,347,316 B1 * | 2/2002 | Redpath ............... G06F 17/289 |
| 6,356,865 B1 | 3/2002 | Franz et al. |
| 6,415,257 B1 | 7/2002 | Junqua et al. |
| 6,449,599 B1 | 9/2002 | Payne et al. |
| 6,477,524 B1 | 11/2002 | Taskiran et al. |
| 6,490,358 B1 | 12/2002 | Geer, Jr. et al. |
| 6,490,563 B2 | 12/2002 | Hon et al. |
| 6,658,627 B1 | 12/2003 | Gallup et al. |
| 6,865,528 B1 | 3/2005 | Huang et al. |
| 6,920,419 B2 | 7/2005 | Kitamura et al. |
| 6,976,207 B1 | 12/2005 | Rujan et al. |
| 6,990,439 B2 | 1/2006 | Xun |
| 7,013,264 B2 | 3/2006 | Dolan et al. |
| 7,031,908 B1 | 4/2006 | Huang et al. |
| 7,050,964 B2 | 5/2006 | Menzes et al. |
| 7,089,493 B2 | 8/2006 | Hatori et al. |
| 7,124,092 B2 | 10/2006 | OToole, Jr. et al. |
| 7,177,792 B2 | 2/2007 | Knight et al. |
| 7,191,447 B1 | 3/2007 | Ellis et al. |
| 7,207,005 B2 | 4/2007 | Lakritz |
| 7,209,875 B2 | 4/2007 | Quirk et al. |
| 7,219,123 B1 | 5/2007 | Fiechter et al. |
| 7,242,988 B1 | 7/2007 | Hoffberg et al. |
| 7,249,013 B2 | 7/2007 | Al-Onaizan et al. |
| 7,272,639 B1 | 9/2007 | Levergood et al. |
| 7,295,962 B2 | 11/2007 | Marcia |
| 7,295,963 B2 * | 11/2007 | Richardson ......... G06F 17/2836 704/2 |
| 7,333,927 B2 | 2/2008 | Lee et al. |
| 7,340,388 B2 | 3/2008 | Soricut et al. |
| 7,353,165 B2 | 4/2008 | Zhou et al. |
| 7,369,984 B2 | 5/2008 | Fairweather |
| 7,389,222 B1 | 6/2008 | Langmead et al. |
| 7,389,223 B2 | 6/2008 | Atkin et al. |
| 7,448,040 B2 | 11/2008 | Ellis et al. |
| 7,454,326 B2 | 11/2008 | Marcu et al. |
| 7,509,313 B2 | 3/2009 | Colledge et al. |
| 7,516,062 B2 | 4/2009 | Chen et al. |
| 7,533,013 B2 | 5/2009 | Marcu |
| 7,620,538 B2 | 11/2009 | Marcu et al. |
| 7,620,549 B2 | 11/2009 | Di Cristo et al. |
| 7,624,005 B2 | 11/2009 | Koehn et al. |
| 7,668,782 B1 | 2/2010 | Reistad et al. |
| 7,680,647 B2 | 3/2010 | Moore |
| 7,716,037 B2 | 5/2010 | Precoda et al. |
| 7,734,459 B2 | 6/2010 | Menezes et al. |
| 7,739,102 B2 | 6/2010 | Bender |
| 7,739,286 B2 | 6/2010 | Sethy et al. |
| 7,788,087 B2 | 8/2010 | Corston-Oliver et al. |
| 7,813,918 B2 | 10/2010 | Muslea et al. |
| 7,817,251 B2 * | 10/2010 | Kimura ............... F16C 32/0618 310/12.05 |
| 7,865,358 B2 | 1/2011 | Green et al. |
| 7,877,251 B2 * | 1/2011 | Kumaran ............... G06F 17/28 704/2 |
| 7,925,493 B2 | 4/2011 | Watanabe et al. |
| 7,945,437 B2 | 5/2011 | Mount et al. |
| 7,983,896 B2 | 7/2011 | Ross et al. |
| 7,983,897 B2 | 7/2011 | Chin et al. |
| 8,078,450 B2 | 12/2011 | Anisimovich et al. |
| 8,135,575 B1 | 3/2012 | Dean |
| 8,195,447 B2 | 6/2012 | Anismovich et al. |
| 8,214,196 B2 | 7/2012 | Yamada et al. |
| 8,239,186 B2 | 8/2012 | Chin et al. |
| 8,239,207 B2 | 8/2012 | Seligman et al. |
| 8,286,185 B2 | 10/2012 | Ellis et al. |
| 8,296,127 B2 | 10/2012 | Marcu et al. |
| 8,352,244 B2 | 1/2013 | Gao et al. |
| 8,364,463 B2 | 1/2013 | Miyamoto et al. |
| 8,386,234 B2 | 2/2013 | Uchimoto et al. |
| 8,423,346 B2 | 4/2013 | Seo et al. |
| 8,442,812 B2 | 5/2013 | Ehsani et al. |
| 8,521,506 B2 | 8/2013 | Lancaster et al. |
| 8,527,260 B2 | 9/2013 | Best et al. |
| 8,548,794 B2 | 10/2013 | Koehn |
| 8,548,995 B1 * | 10/2013 | Curtiss ............... G06F 17/30696 707/726 |
| 8,554,591 B2 | 10/2013 | Reistad et al. |
| 8,594,992 B2 | 11/2013 | Kuhn et al. |
| 8,600,728 B2 | 12/2013 | Knight et al. |
| 8,606,900 B1 | 12/2013 | Levergood et al. |
| 8,612,203 B2 | 12/2013 | Foster et al. |
| 8,615,388 B2 | 12/2013 | Li et al. |
| 8,635,327 B1 | 1/2014 | Levergood et al. |
| 8,635,539 B2 | 1/2014 | Young et al. |
| 8,666,725 B2 | 3/2014 | Och |
| 8,676,563 B2 | 3/2014 | Soricut et al. |
| 8,688,454 B2 | 4/2014 | Zheng |
| 8,725,496 B2 | 5/2014 | Zhao et al. |
| 8,768,686 B2 | 7/2014 | Sarikaya et al. |
| 8,775,154 B2 | 7/2014 | Clinchant et al. |
| 8,818,790 B2 | 8/2014 | He et al. |
| 8,843,359 B2 | 9/2014 | Lauder |
| 8,843,482 B2 | 9/2014 | Buriano et al. |
| 8,862,456 B2 | 10/2014 | Krack et al. |
| 8,886,517 B2 | 11/2014 | Soricut et al. |
| 8,898,052 B2 | 11/2014 | Waibel et al. |
| 8,903,707 B2 | 12/2014 | Zhao et al. |
| 8,930,176 B2 | 1/2015 | Li et al. |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,972,268 B2 | 3/2015 | Waibel et al. |
| 9,026,425 B2 * | 5/2015 | Nikoulina ............ G06F 17/2818 704/1 |
| 9,053,202 B2 | 6/2015 | Viswanadha et al. |
| 9,081,762 B2 | 7/2015 | Wu et al. |
| 9,141,606 B2 | 9/2015 | Marciano et al. |
| 9,176,952 B2 | 11/2015 | Aikawa et al. |
| 9,183,192 B1 | 11/2015 | Ruby, Jr. et al. |
| 9,183,198 B2 | 11/2015 | Shen et al. |
| 9,201,870 B2 | 12/2015 | Jurach, Jr. et al. |
| 9,208,144 B1 | 12/2015 | Abdulnasyrov et al. |
| 9,208,509 B1 | 12/2015 | Curran et al. |
| 9,396,184 B2 | 7/2016 | Roy et al. |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman et al. |
| 9,600,473 B2 | 3/2017 | Leydon et al. |
| 9,613,026 B2 | 4/2017 | Hodson |
| 2001/0027460 A1 | 10/2001 | Yamamoto et al. |
| 2001/0029455 A1 | 10/2001 | Chin et al. |
| 2002/0042790 A1 | 4/2002 | Nagahara |
| 2002/0046018 A1 | 4/2002 | Marcu et al. |
| 2002/0083103 A1 | 6/2002 | Ballance et al. |
| 2002/0124109 A1 | 9/2002 | Brown |
| 2002/0165724 A1 | 11/2002 | Blankesteijn |
| 2003/0009320 A1 | 1/2003 | Furuta |
| 2003/0040899 A1 | 2/2003 | Ogilvie |
| 2003/0046056 A1 | 3/2003 | Godoy et al. |
| 2003/0200094 A1 | 10/2003 | Gupta et al. |
| 2004/0006585 A1 | 1/2004 | Paulus et al. |
| 2004/0006744 A1 | 1/2004 | Jones et al. |
| 2004/0034520 A1 | 2/2004 | Langkilde-Geary et al. |
| 2004/0044517 A1 | 3/2004 | Palmquist |
| 2004/0064552 A1 | 4/2004 | Chong et al. |
| 2004/0085354 A1 | 5/2004 | Massand |
| 2004/0088647 A1 | 5/2004 | Miller et al. |
| 2004/0167768 A1 | 8/2004 | Travieso et al. |
| 2004/0205656 A1 | 10/2004 | Reulein et al. |
| 2004/0255281 A1 | 12/2004 | Imamura et al. |
| 2005/0055630 A1 | 3/2005 | Scanlan |

(56) References Cited

U.S. PATENT DOCUMENTS

| | | |
|---|---|---|
| 2005/0171944 A1 | 8/2005 | Palmquist |
| 2005/0177358 A1 | 8/2005 | Melomed et al. |
| 2006/0031225 A1 | 2/2006 | Palmeri et al. |
| 2006/0095526 A1 | 5/2006 | Levergood et al. |
| 2006/0155716 A1 | 7/2006 | Vasishth et al. |
| 2006/0184410 A1 | 8/2006 | Ramamurthy et al. |
| 2006/0248084 A1 | 11/2006 | Sack et al. |
| 2006/0282255 A1 | 12/2006 | Lu et al. |
| 2007/0043553 A1 | 2/2007 | Dolan |
| 2007/0073544 A1 | 3/2007 | Millett et al. |
| 2007/0106633 A1 | 5/2007 | Reiner |
| 2007/0112553 A1 | 5/2007 | Jacobson |
| 2007/0112851 A1 | 5/2007 | Tomic et al. |
| 2007/0136065 A1 | 6/2007 | Chiu et al. |
| 2007/0136284 A1 | 6/2007 | Cobb et al. |
| 2007/0188657 A1 | 8/2007 | Basson et al. |
| 2007/0198245 A1 | 8/2007 | Kamatani et al. |
| 2007/0211071 A1 | 9/2007 | Slotznick et al. |
| 2007/0294076 A1* | 12/2007 | Shore ............... G06F 17/2836 704/2 |
| 2007/0294080 A1 | 12/2007 | Bangalore |
| 2008/0005670 A1 | 1/2008 | Pravetz et al. |
| 2008/0040635 A1 | 2/2008 | Larcheveque et al. |
| 2008/0077391 A1 | 3/2008 | Chino et al. |
| 2008/0077392 A1 | 3/2008 | Kamatani et al. |
| 2008/0086298 A1 | 4/2008 | Anismovich et al. |
| 2008/0088437 A1 | 4/2008 | Aninye et al. |
| 2008/0102433 A1 | 5/2008 | Rogers et al. |
| 2008/0109374 A1 | 5/2008 | Levergood et al. |
| 2008/0133245 A1 | 6/2008 | Proulx et al. |
| 2008/0134018 A1 | 6/2008 | Kembel et al. |
| 2008/0154577 A1 | 6/2008 | Kim et al. |
| 2008/0159495 A1 | 7/2008 | Dahan |
| 2008/0183758 A1 | 7/2008 | Kennedy |
| 2008/0195372 A1 | 8/2008 | Chin et al. |
| 2008/0201344 A1 | 8/2008 | Levergood et al. |
| 2008/0254430 A1 | 10/2008 | Woolf et al. |
| 2008/0254433 A1 | 10/2008 | Woolf et al. |
| 2008/0270142 A1 | 10/2008 | Srinivasan et al. |
| 2008/0288240 A1 | 11/2008 | DAgostini |
| 2009/0013162 A1 | 1/2009 | Nandan et al. |
| 2009/0024595 A1 | 1/2009 | Chen |
| 2009/0048821 A1 | 2/2009 | Yam et al. |
| 2009/0094017 A1 | 4/2009 | Chen et al. |
| 2009/0217196 A1 | 8/2009 | Neff et al. |
| 2009/0222257 A1 | 9/2009 | Sumita et al. |
| 2009/0240539 A1 | 9/2009 | Slawson et al. |
| 2009/0271283 A1 | 10/2009 | Fosnacht et al. |
| 2009/0313005 A1 | 12/2009 | Jaquinta |
| 2009/0327294 A1 | 12/2009 | Bailor et al. |
| 2010/0057439 A1 | 3/2010 | Ideuchi et al. |
| 2010/0057561 A1 | 3/2010 | Gifford |
| 2010/0115284 A1 | 5/2010 | Hahn et al. |
| 2010/0121630 A1 | 5/2010 | Mende et al. |
| 2010/0161643 A1 | 6/2010 | Gionis et al. |
| 2010/0179803 A1 | 7/2010 | Sawaf et al. |
| 2010/0185648 A1 | 7/2010 | Chauhan et al. |
| 2010/0257457 A1 | 10/2010 | De Goes |
| 2011/0029300 A1 | 2/2011 | Marcu et al. |
| 2011/0066469 A1 | 3/2011 | Kadosh |
| 2011/0077933 A1 | 3/2011 | Miyamoto et al. |
| 2011/0082683 A1 | 4/2011 | Soricut et al. |
| 2011/0082684 A1 | 4/2011 | Soricut et al. |
| 2011/0087680 A1 | 4/2011 | Murdock et al. |
| 2011/0097693 A1 | 4/2011 | Crawford |
| 2011/0137636 A1 | 6/2011 | Srihari et al. |
| 2011/0184722 A1* | 7/2011 | Sneddon ............... G06F 17/289 704/7 |
| 2011/0209047 A1 | 8/2011 | Olsen et al. |
| 2011/0225104 A1 | 9/2011 | Soricut et al. |
| 2011/0282648 A1 | 11/2011 | Sarikaya et al. |
| 2012/0005156 A1 | 1/2012 | Grant et al. |
| 2012/0022852 A1 | 1/2012 | Tregaskis et al. |
| 2012/0078609 A1 | 3/2012 | Chaturvedi et al. |
| 2012/0221319 A1 | 8/2012 | Trese |
| 2012/0221593 A1 | 8/2012 | Trese et al. |
| 2012/0271828 A1 | 10/2012 | Raghunath |
| 2012/0296914 A1 | 11/2012 | Romanov et al. |
| 2012/0330990 A1 | 12/2012 | Chen et al. |
| 2013/0055074 A1 | 2/2013 | Trese et al. |
| 2013/0144605 A1* | 6/2013 | Brager ............... G06F 17/28 704/9 |
| 2013/0173247 A1 | 7/2013 | Hodson |
| 2013/0325442 A1 | 12/2013 | Dahlmeier et al. |
| 2013/0325833 A1 | 12/2013 | Guan et al. |
| 2014/0058718 A1 | 2/2014 | Kunchukuttan et al. |
| 2014/0142917 A1 | 5/2014 | DPenha |
| 2014/0142918 A1 | 5/2014 | Dotterer et al. |
| 2014/0229257 A1 | 8/2014 | Reistad et al. |
| 2014/0289702 A1 | 9/2014 | McMahon et al. |
| 2014/0297252 A1 | 10/2014 | Prasad et al. |
| 2014/0358519 A1 | 12/2014 | Mirkin et al. |
| 2014/0358524 A1 | 12/2014 | Papula et al. |
| 2014/0365201 A1 | 12/2014 | Gao et al. |
| 2015/0051896 A1 | 2/2015 | Simard et al. |
| 2015/0154180 A1 | 6/2015 | Trese |
| 2015/0186362 A1 | 7/2015 | Li et al. |

FOREIGN PATENT DOCUMENTS

| | | |
|---|---|---|
| AU | 5202299 A | 10/1999 |
| CA | 2221506 A1 | 12/1996 |
| CN | 102193914 A | 9/2011 |
| CN | 102662935 A | 9/2012 |
| CN | 102902667 A | 1/2013 |
| DE | 69525374 T2 | 3/1995 |
| DE | 69431306 T2 | 10/2002 |
| DE | 69633564 T2 | 11/2004 |
| EP | 0734556 A1 | 10/1996 |
| EP | 0803103 A1 | 10/1997 |
| EP | 0830774 A2 | 3/1998 |
| EP | 1128301 A2 | 8/2001 |
| EP | 1128302 A2 | 8/2001 |
| EP | 1128303 A2 | 8/2001 |
| EP | 1235177 A2 | 8/2002 |
| EP | 0830774 B1 | 10/2004 |
| EP | 1489523 A2 | 12/2004 |
| EP | 2299369 A1 | 3/2011 |
| EP | 2909742 | 8/2015 |
| GB | 2241359 A | 8/1991 |
| JP | H10509543 A | 9/1998 |
| JP | H11507752 A | 7/1999 |
| JP | 3190881 B2 | 7/2001 |
| JP | 3190882 B2 | 7/2001 |
| JP | 3260693 B2 | 2/2002 |
| JP | 3367675 G2 | 1/2003 |
| JP | 2003157402 A | 5/2003 |
| JP | 3762882 B2 | 4/2006 |
| JP | 2006216073 A | 8/2006 |
| JP | 2007042127 A | 2/2007 |
| JP | 2008026971 | 2/2008 |
| JP | 4485548 B2 | 6/2010 |
| JP | 4669373 B2 | 4/2011 |
| JP | 4669430 B2 | 4/2011 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO2007068123 A1 | 6/2007 |
| WO | WO2010062540 A1 | 6/2010 |
| WO | WO2010062542 A1 | 6/2010 |
| WO | WO2012118764 | 9/2012 |
| WO | WO2012118765 | 9/2012 |

(56) References Cited

FOREIGN PATENT DOCUMENTS

| WO | WO2013028322 | 2/2013 |
|----|--------------|--------|
| WO | WO2014060549 | 4/2014 |

OTHER PUBLICATIONS

Bernth et al., "The Effect of Source Analysis on Translation Confidence", In: "Envisioning Machine Translation in the Information Future", Jan. 1, 2000, p. 89-99.
Uchimoto et al., "Automatic Rating of Machine Translatability", 10th Machine Translation Summit (MT Summit X), Sep. 12, 2005, p. 235-242.
Underwood et al., "Translatability Checker: A Tool to Help Decide Whether to Use MT", Proceedings of MT Summit VIII: Machine Translation in the Information Age., Jul. 18, 2001, p. 1-4.
Choumane et al., "Integrating translation services within a structured editor", Proceedings of the 2005 ACM Symposium on Document Engineering, DOCENG '05, Nov. 2, 2005, p. 165-167.
Venkatapathy et al., "An SMT-driven Authoring Tool", Proceedings of Coling 2012: Demonstration Papers Coling 2012, Dec. 8, 2012, p. 459-466.
International Search Report and Written Opinion dated Jul. 2, 2014 in Application No. PCT/EP2013/071781 filed Oct. 17, 2013.
International Search Report and Written Opinion dated May 31, 2012, re International Application No. PCT/US2012/026815 filed Feb. 27, 2012.
International Search Report and Written Opinion dated Jun. 22, 2012, re International Application No. PCT/US2012/026814 filed Feb. 27, 2012.
Dunlap et al., "ReVirt: Enabling Intrusion Analysis through Virtual-Machine Logging and Replay", Dec. 11, 2002, USENIX Association.
Pun et al., "Audit Trail Analysis for Traffic Intensive Web Application", 2009, IEEE.
Akkus et al., "Non-Tracking Web Analytics", Oct. 18, 2012, ACM.
Pusara, M., "An Examination of User Behavior for Re-Authentication", Aug. 2007, Center for Education and Research in Information Assurance and Security, Purdue University.
International Search Report and Written Opinion dated Oct. 16, 2012 in Application No. PCT/US2012/049063 filed Jul. 31, 2012.
Non-Final Office Action, dated Sep. 2, 2015, U.S. Appl. No. 14/325,198, filed Jul. 7, 2014.
Final Office Action, dated Sep. 3, 2015, U.S. Appl. No. 13/037,273, filed Feb. 28, 2011.
Final Office Action, dated Aug. 5, 2015, U.S. Appl. No. 13/217,122, filed Aug. 24, 2011.
Final Office Action, dated Apr. 4, 2016, U.S. Appl. No. 14/325,198, filed Jul. 7, 2014.
Non-Final Office Action, dated Jun. 28, 2016, U.S. Appl. No. 13/037,273, filed Feb. 28, 2011.
Notice of Allowance, dated Jul. 29, 2016, U.S. Appl. No. 14/325,198, filed Jul. 7, 2014.
Ishida, "W3C I18n Tutorial: Declaring Language in XHTML and HTML," Oct. 27, 2010, www.w3.org/International/tutorials/language-decl, pp. 1-7.
Jones, Rosie et al., "Beyond the Session Timeout: Automatic Hierarchical Segmentation of Search Topics in Query Logs," CIKM '08, Oct. 26-30, 2008, pp. 699-708.
Ceylan, Hakan et al., "Language Identification of Search Engine Queries," Proceedings of the 47th Annual Meeting fo the ACL and the 4th IJCNLP of the AFNLP, Aug. 2-7, 2009, pp. 1066-1074.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
"Callison-Burch et al. "Proceedings of the Seventh Workshop on Statistical Machine Translation" [W12-3100] Proceedings of the Seventh Workshop on Statistical Machine Translation, Jun. 7, 2012, pp. 1-51. Retrieved from: http://aclanthology.info/volumes/proceedings-of-the-seventh-workshop-onstatistical-machine-translation".
"Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from:http://aclanthology.info/volumes/proceedings-of-the-seventh-workshop-onstatistical-machine-translation".
"Avramidis, Eleftherios. "Quality estimation for Machine Translation output using linguisticanalysis and decoding features" [W12-3108] Proceedings of the Seventh Workshop on Statistical Machine Translation, Jun. 7, 2012, pp. 84-90. Retrieved from:http://aclanthology.info/volumes/proceedings-of-the-seventh-workshop-onstatistical-machine-tanslation".
"Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from:Proceedings of the Seventh Workshop on Statistical Machine Translation. Retrieved from:http://aclanthology.info/volumes/proceedings-of-the-seventh-workshop-onstatistical-machine-translation".
"Felice et al. "Linguistic Features for Quality Estimation" [W12-3110] Proceedings of the Seventh Workshop on Statistical Machine Translation, Jun. 7, 2012, pp. 96-103. Retrieved at:http://aclanthology.info/volumes/proceedings-of-the-seventh-workshop-onstatistical-machine-translation".
"Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from:http://aclanthology.info/volumes/proceedings-of-the-seventh-workshop-onstatistical-machine-translation".
"Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation".
"Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from:http://aclanthology.info/volumes/proceedings-of-the-seventh-workshop-onstatistical-machine-translation".
"Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from:http://aclanthology.info/volumes/proceedings-of-the-seventh-workshop-onstatistical-machine-translation".
"Gonzalez et al. "The UPC Submission to the WMT 2012 Shared Task on QualityEstimation" [W12-3115] Proceedings of the Seventh Workshop on Statistical Machine Translation, Jun. 7, 2012, pp. 127-132. Retrieved from:http://aclanthology.info/volumes/proceedings-of-the-seventh-workshop-onstatistical-machine-translation".
"Popovic, Maja. "Morpheme- and POS-based IBM1 and language model scores fortranslation quality estimation" Proceedings of the Seventh Workshop on Statistical Machine Translation, Jun. 7, 2012, pp. 133-137. Retrieved from:http://aclanthology.info/volumes/proceedings-of-the-seventh-workshop-onstatistical-machine-translation".
"Rubino et al. "DCU-Symantec Submission for the WMT 2012 Quality EstimationTask" [W12-3117] Proceedings of the Seventh Workshop on Statistical Machine Translation, Jun. 7, 2012, pp. 138-144. Retrieved from:http://aclanthology.info/volumes/proceedings-of-the-seventh-workshop-onstatistical-machine-translation".
"Soricut et al. "The SDL Language Weaver Systems in the WMT12 Quality Estimation Shared Task" [W12-3118] Proceedings of the Seventh Workshop on Statistical Machine Translation, Jun. 7, 2012,

(56) References Cited

OTHER PUBLICATIONS pp. 145-151. Retrieved from:http://aclanthology.info/volumes/proceedings-of-the-seventh-workshop-onstatistical-machine-translation".

Wu et al. "Regression with Phrase Indicators for Estimating MT Quality" [W12-3119] Proceedings of the Seventh Workshop on Statistical Machine Translation, Jun. 7, 2012, pp. 152-156. Retrieved from:http://aclanthology.info/volumes/proceedings-of-the-seventh-workshop-onstatistical-machine-translation".

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the Internet:<https://lilt.com/kb/translators/best-practices>, 2 pages.

"Data Security—Knowledge Base," Lilt website [online], Oct. 14, 2016 [retrieved on Oct. 19, 2017], Retrieved from the Internet:<https://lilt.com/kb/security>, 1 pages.

"Data Security and Confidentiality," Lilt website [online], 2017 [retrieved on Oct. 19, 2017], Retrieved from the Internet: <https://lilt.com/security>, 7 pages.

"Memories—Knowledge Base," Lilt website [online], Jun. 7, 2017 [retrieved on Oct. 19, 2017], Retrieved from the Internet:<https://lilt.com/kb/project-managers/memory>, 4 pages.

"Memories (API)—Knowledge Base," Lilt website [online], Jun. 2, 2017 [retrieved on Oct. 19, 2017], Retrieved from the Internet:<https://lilt.com/kb/api/memories>, 1 page.

"Quoting—Knowledge Base," Lilt website [online], Jun. 7, 2017 [retrieved on Oct. 19, 2017], Retrieved from the Internet: <https://lilt.com/kb/project-managers/quoting>, 4 pages.

"The Editor—Knowledge Base," Lilt website [online], Aug. 15, 2017 [retrieved on Oct. 19, 2017], Retrieved from the Internet:<https://lilt.com/kb/translators/editor>, 5 pages.

"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.

"What is Lilt_—Knowledge Base," Lilt website [online],Dec. 15, 2016 [retrieved on Oct. 19, 2017], Retrieved from the Internet:<https://lilt.com/kb/what-is-lilt, 1 page.

"Getting Started—Knowledge Base," Lilt website [online], Apr. 11, 2017 [retrieved on Oct. 20, 2017], Retrieved from the Internet:<https://lilt.com/kb/translators/getting-started, 2 pages.

"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.

"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.

"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.

"Lilt API_API Reference," Lilt website [online], retrieved on Oct. 20, 2017, Retrieved from the Internet:<https://lilt.com/docs/api>, 53 pages.

"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.

"Projects—Knowledge Base," Lilt website [online], Jun. 7, 2017, retrieved on Oct. 20, 2017, Retrieved from the Internet: <https://lilt.com/kb/project-managers/projects>, 3 pages.

"Getting Started with lilt," Lilt website [online], May 30, 2017, retrieved on Oct. 20, 2017, Retrieved from the Internet: <https://lilt.com/kb/api/lilt-js>, 6 pages.

"Interactive Translation—Knowledge Base," Lilt website [online], Aug. 17, 2017, retrieved on Oct. 20, 2017, Retrieved from the Internet<https://lilt.com/kb/api/interactive-translation>, 2 pages.

"Hildebrand et al., ""Adaptation of the Translation Model for StatisticalMachine Translation based on InformationRetrieval,""" EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval."

Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.

"Sethy et al., ""Building Topic Specific Language Models Fromwebdata Usingcompetitive Models,""" Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models."

Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.

Business Wire, "Language Weaver Introduces User-Managed Customization Tool," Oct. 25, 2005, 3 pages. Retrieved from http: ProQuest.

Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.

"Potet et al., ""Preliminary Experiments on Using Users' Post-Editions to Enhance a SMT System,""" Proceedings of the European Association forMachine Translation (EAMT), May 2011, pp. 161-168. Retrieved from Retrieved at http://www.mt-archive.info/EAMT-2011-Potet.pdf."

Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.

"Lopez-Salcedo et al.,""Online Learning of Log-Linear Weights in Interactive Machine Translation,""" Communications in Computer and InformationScience, vol. 328, 2011, pp. 1-10. Retrieved from http://www.casmacat.eu/uploads/Main/iberspeech2.pdf."

Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.

"Levenberg et al.""Stream-based Translation Models for Statistical Machine Translation"" Human Language Technologies: The 2010 Annual Conference of the North AmericanChapter of the ACL, Dec. 31, 2010, pp. 394-402.".

Lagarda et al. "Statistical Post-Editing of a Rule Based Machine Translation System" Proceedings of NAACL HLT 2009: Short Papers, Jun. 2009, pp. 217-220.

Ehara, "Rule Based Machine Translation Combined with Statistical Post Editor for Japanese to English Patent Translation," MT Summit XI, 2007, pp. 13-18.

Trese, Andrew, "Systems, Methods and Media for Translating Informational Content", U.S. Appl. No. 13/037,262, filed Feb. 28, 2011, 34 pages.

Bechara et al. "Statistical Post-Editing for a Statistical MT System" Proceedings of the 13th Machine Translation Summit, 2011, pp. 308-315.

Non-Final Office Action, dated Aug. 28, 2017, U.S. Appl. No. 13/037,273, filing date Feb. 28, 2011.

Non-Final Office Action, dated Sep. 21, 2017, U.S. Appl. No. 13/217,122, filing date Aug. 24, 2011.

\* cited by examiner

205 This is a bright green sentence.
210 This is a simple sentence that turns medium green.
215 This sentence is rather complex and will turn light green.
220 This sentence error grammar has turns orange therefore.
225 thissentenceisimpossibletotranslateandwillshowred

FIG. 2

STATISTICAL LINGUISTIC ANALYSIS OF SOURCE CONTENT

FIELD OF THE PRESENT TECHNOLOGY

The present technology relates generally to improving the quality of source text that is to be translated into one or more languages. The source text may be improved using one or more types of statistical linguistic analysis to evaluate source text input into an authoring environment.

BACKGROUND

Purely rule-based methods for analyzing the translatability of source texts into other languages are often inflexible processes that generate considerable noise. For example, false positive errors may be generated when evaluating a possible translation of a source text into one or more target languages because the rule-based analysis outputs either a pass or fail for a proposed translation. Purely rule-based methods for analyzing the overall quality of source text for linguistic features such as spelling, syntax, grammar, style, word choice, and so forth are also similarly deficient.

SUMMARY OF THE PRESENT TECHNOLOGY

According to some embodiments, the present technology may be directed to methods that include: (a) evaluating a source text using one or more types of statistical linguistic analysis to determine a translatability of the source text; and (b) providing the translatability of the source text to a client node.

According to other embodiments, the present technology may be directed to systems that include: (a) at least one computing device comprising a memory that includes executable instructions and a processor executing the instructions to: (i) evaluate a source text using one or more types of statistical linguistic analysis to determine a translatability of the source text; and (ii) provide the translatability of the source text to a client node.

According to additional embodiments, the present technology may be directed to methods that include improving an overall quality of a source text input into an authoring environment, the overall quality of the source text being determined from an analysis of outputs of a plurality of statistical linguistic analyzers, the overall quality of the source text being improved by replacing at least a portion of the source text with one or more suggestions having a high statistical match with content previously reviewed as high quality and applicable to a target audience.

According to various embodiments, the present technology may be directed to a non-transitory machine-readable storage medium having embodied thereon a program. In some embodiments the program may be executed by a machine to perform a method. The method may comprise: (a) evaluating a source text using one or more types of statistical linguistic analysis to determine a translatability of the source text; and (b) providing the translatability of the source text to a client node.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 2 illustrates the highlighting of several source sentences.

DETAILED DESCRIPTION OF EXEMPLARY EMBODIMENTS

Figure 1:
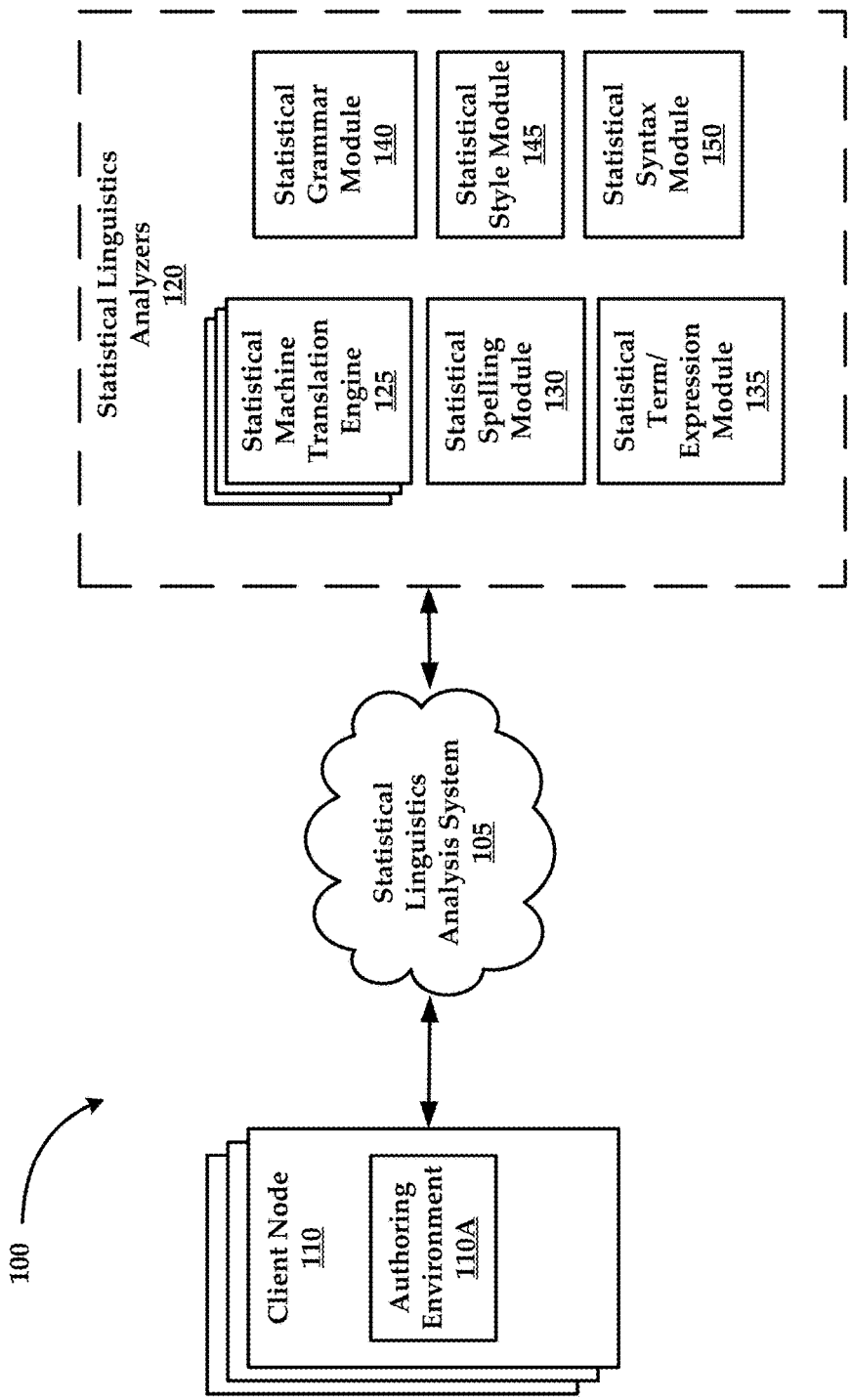
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be used to improve the translatability of a source text. Additionally, the present technology may be configured to improve an overall quality of a source text in order to reduce translation costs, increase search engine optimization attributes, and/or improve other qualities of the source text. In some instances, the present technology may increase readability of content and provide assistance to non-native writers (e.g., authors who are not fluent in the source language), as well as helping to ensure that content adheres to established corporate guidelines.

These and other advantages of the present technology will be described in greater detail below with reference to the collective drawings (e.g., FIGS. 1-5).

FIG. 1 illustrates an exemplary architecture 100 for practicing aspects according to the present technology. According to some embodiments, the exemplary architecture 100, hereinafter "architecture 100," may generally include a statistical linguistics analysis system, hereinafter "system 105." According to some embodiments, the system 105 may be configured to evaluate a source text using one or more types of statistical linguistic analysis to determine a translatability of the source text. Additionally, the system 105 may provide the translatability of the source text to a client node. The translatability of the source text may be illustrated by highlighting the source text within an operating (or authoring) environment 110A that operates on a client node 110. According to some embodiments, the client node 110 may comprise a server. Thus, the authoring environment 110A includes a web-based authoring environment. In other embodiments, the client node 110 may comprise an end user computing device, where the authoring environment 110A is executed within a browser client or an authoring environment program. Exemplary views of authoring environments that may be used to practice aspects of the present technology will be described in greater detail below.

In some embodiments, the system 105 may improve an overall quality of a source text input into an authoring environment. The overall quality of the source text may be determined from an analysis of outputs of a plurality of statistical linguistic analyzers. The system 105 may improve the overall quality of the source text by replacing at least a portion of the source text with one or more suggestions generated from one or more statistical models. Additional details regarding many of the statistical linguistic analyzers which may be used in accordance with the present disclosure are provided below.

In some instances, the system 105 may be implemented within a cloud-based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, the users place workload demands upon the cloud that vary in real-time, sometimes dramatically. The nature and extent of these variations typically depend on the type of business associated with the user.

The system 105 may communicatively couple with the client node 110 via a network connection, which may comprise any private, such as a local area network (LAN) and/or public network, such as the Internet, although the network may comprise any computing network that would be known to one of ordinary skill in the art with the present disclosure before them.

According to some embodiments, the system 105 may receive a source text (e.g., words in a source language) from the authoring environment 110A. That is, when an end user types or otherwise inputs source text into the authoring environment 110A, the source text may be passed to the system 105. In some circumstances, the words may be passed in a synchronous manner, such that when the end user completes typing of a word (or even character-by-character) into the authoring environment 110A, the word is then passed to the system 105. In other instances, the source text may be passed to the authoring environment 110A upon the end user entering a completed sentence.

It is envisioned that after receiving the source text from the authoring environment 110A, the system 105 may transmit the source text to one or more statistical linguistics analyzers 120. The number of statistical linguistic analyzers used to process the source text may vary according to author preference. For example, the author may only desire to understand the translatability of their source text from a purely translation-based analysis. In other instances, the author may also desire to understand the translatability of their source text with reference to other statistical linguistic metrics such as spelling, grammar, style, expressions, and so forth, in addition to the translation-based analysis. In some embodiments, the present technology may allow for word frequency and n-gram analysis to determine rare word sequences. Thus, the author may evaluate the translatability of the source text using any desired permutation of statistical linguistic analysis methods described herein.

For example, while a source text that includes a spelling error may translate well into one target language, the same may not be true when the source text is translated into other target languages. Errors in grammar, style, syntax, terminology, expressions, and so forth may also pose significant problems when translating a source text into multiple target languages. Thus, it may be advantageous to conduct a multifaceted translatability analysis for an instance of source text.

Advantageously, the "translatability" of a source text may refer not only to how well the source text may be translated into one or more target languages from statistical matching against various parallel corpora, but also how other statistical linguistic metrics (e.g., spelling, SEO value, grammar, etc.) quantify the overall quality of the source text.

According to some embodiments, the translatability of a source text may be determined by transmitting the source text to one or more statistical machine translation engines, such as statistical machine translation engine, or "SMT engine 125." The SMT engine 125 may generate a translation of the source text using, for example, a parallel corpus for facilitating the capability of translating words in the source language into a target language. In some embodiments, the SMT engine 125 may comprise a translation memory. In some instances, the SMT engine 125 may locate possible alternative translations for the source text. The SMT engine 125 may also generate trust scores for one or more translations of the source text. In other instances, the system 105 may generate a trust score from a translation generated by one or more SMT engines.

Briefly described, to determine a trust score for a translation the SMT engine 125 may evaluate the source text and the target translation to determine the accuracy of the translation. The SMT engine 125 may evaluate the translation complexity and the translation constructs of the translation to determine a trust score.

In other instances, the SMT engine 125 may compare a target translation generated by a trusted translation system against a translation of the same source text generated by an untrusted translation system. The SMT engine 125 may efficiently calculate a trust score for the target translation of the trusted translation system. In some embodiments, by determining differences between the translations of the same source text by both the trusted and untrusted translation systems, an SMT engine 125 may infer or approximate a trust score for the translation generated by an untrusted translation system. For example, if there are relatively few differences between the target translations, and the trust score for the trusted translation is high, the SMT engine 125 may infer that the trust score for an untrusted translation system is also high.

In some instances, the SMT engine 125 may include a domain-based statistical machine translation engine. A domain based SMT engine is a SMT engine that has been trained on a domain specific corpus of training documents. For example, an SMT engine that is used in the travel industry may be trained on a training corpus of travel specific documents. Thus, if your source text is domain specific, a domain-based SMT engine may be used to efficiently translate the domain specific source text. Thus, trust scores generated by domain-based SMT engines are indicative of how translatable the source text is relative to a particular domain. Additionally, trust scores may also be utilized to determine how well textual content matches the domain used by the domain-based SMT engine.

Translating a domain specific source text with a domain-based SMT engine, where the domain of the source text and the domain of the SMT engine are different from each another may be used to create a "general understanding" trust score. For example, translating a source text that is sports specific with a non-domain specific (general) SMT may be use as a basis for calculating a general readability score for non-domain experts. It can be used to pick up domain jargon embedded in the text. Indeed, brief source texts with correctly spelled words, and simple and proper grammar, are more likely to be translated correctly by any given SMT engine, regardless of the domain associated with either the source text or the parallel corpus used by the SMT engine.

In some instances, to determine a more robust translatability for a source text, trust scores may be generated by translating the source text into a plurality of target languages as well as a plurality of domains for each of the target languages.

In some instances, the SMT engine 125 may obtain translations from cache storage. That is, as translations of source text occur, each SMT engine may store translation pairs in a cache repository. The cache repository may reside in memory of the SMT engine 125 or may reside in cloud storage. Additionally, trust scores generated for the translation pairs may also be stored in cache storage. When the source text includes a previously translated instance of source text, the SMT engine 125 may obtain the translation and/or trust score from the cache repository, which results in performance enhancements compared to a retranslation of the source text from scratch.

Additional details regarding the generation of trust scores for translations may be found in U.S. patent application Ser. No. 13/539,037, filed on Jun. 29, 2012, U.S. patent application Ser. No. 12/820,061, filed on Jun. 21, 2010, and U.S. patent application Ser. No. 13/037,262, filed on Feb. 28, 2011, all of which are hereby incorporated by reference herein including all reference cited therein.

Again, the trust score may be used, at least in part, as the basis for determining the translatability of the source text. Thus, in some instances, the translatability may correspond to a trust score for translating the source text into a single target language. In other instances, the trust score may comprise an average trust score. The average trust score may comprise an average of all trust scores generated for a plurality of translations for multiple languages. Therefore, if the source text is to be translated into a plurality of languages, the trust score may be a composite or average of all trust scores. In other embodiments, if certain translations are relatively unimportant, the trust score may comprise an average weighted score. For example, if the author indicates that translations into French and German are more important than translations into Greek or Spanish, the system 105 may assign a different weighting to each trust score used in generating the average trust score value.

The system 105 may use the trust score(s) as a basis for assigning a translatability to the source text. The system 105 may utilize ranges of trust scores to assign a translatability to the source text. For example, if trust scores are measured as a percentage match between the source text and a trusted translation, the system 105 may create percentages to various ranges of trust scores. Relatively low trust scores for a source text may be associated with relatively low translatability, while relatively high trust scores for a source text may be associated with relatively high translatability. Thus, the translatability of the source text may directly correlate with the trust score generated for the source text.

FIG. 2 illustrates an exemplary source texts having been enhanced to reflect translatability. Using the translatability determined for the source text, the system 105 may apply an enhancement such as highlighting or color to the source text that represents the translatability. These enhancements may be used to visually differentiate source texts having varying translatability from one another within the authoring environment. Other examples of enhancements include borders or outlining, icon placement, and so forth. In some instances, the source text may be highlighted using the color assigned to the source text. Again, using colors to indicate translatability is examplary of a dynamic feedback system that uses scores calculated by the system 105 used to help authors to improve in realtime the translatability and quality of a text. Usage of the resulting analysis scores are not limited to this example. The colors or highlighting only provide easy visual clues on where to focus.

A first sentence 205 of source text may include the words "This is a bright green sentence." This source text is relatively simple to translate as the first sentence 205 includes simple words. The grammar and syntax used to craft the first sentence 205 is simple and the first sentence 205 contains no complex word pairs, homonyms, or other features that may complicate the translation process. Additionally, the brevity of the first sentence 205 is beneficial when considering potential multilanguage translations. Moreover, if the content is to be used in mobile or web-based publications, brevity of content may be preferred.

Comparatively, the second sentence 210 of source text includes more words and more adjectives. Additionally, the syntactic structure of "sentence that turns medium green" may be relatively difficult to translate into other languages. Therefore, the system 105 may assign a medium shade of green to the second sentence 210. According to some embodiments, color choices can be different based upon task the author is trying to accomplish. For example, the system 105 highlight/color all sentences where a human translator is 100% necessary. The colors used in the example where chosen to help an author dynamically improve a piece of text. An editor tasked with reviewing a document may have a different goal and may want the riskiest text to be strongly highlighted.

Sentences 215-225 are comparatively more difficult to translate than first and second sentences 205 and 210, respectively, for a variety of reasons including word complexity, word combination complexity, grammar errors, and so forth. Each of the sentences 215-225 may be highlighted with a different color. It will be understood that source texts that produce extremely poor translations or that include egregious spelling, syntax, or grammar errors may be highlighted with a bold color such as red.

If the end user desires to determine translatability of the source text in light of more than a trust score, the system 105 may transmit the source text to one or more of the statistical linguistics analyzers 120. Additionally, these additional analyzers may also be used to determine an overall quality of the source text.

Exemplary statistical linguistics analyzers 120 may comprise not only the aforementioned SMT engine(s) 125, but also a statistical spelling module 130, a statistical term/expression module 135, a statistical grammar module 140, a statistical style module 145, and a statistical syntax module 150—just to name a few. One of ordinary skill in the art will appreciate that the statistical linguistics analyzers 120 may comprise any number of devices that are configured to analyze source text relative to one or more facets of linguistics. In some instances, one or more of the statistical linguistics analyzers 120 may employ rule-based verification where appropriate. The use of rule-based verification may avoid false positive analysis of content.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules may include separately configured web servers.

For example, if the end user desires to analyze overall quality of the source text in terms of spelling, grammar, and syntax, the system 105 may transmit the source text to the statistical spelling module 130, the statistical grammar module 140, and the statistical syntax module 150, respectively. Each of these modules may generate a unique score for the source text. Each of these scores may be used, along with the translation trust score, to determine an overall quality for the source text.

Additionally, the author may assign weights to each of these facets of statistical linguistic analysis. For example, the author may desire to attribute more weight to correctness of spelling as opposed to syntax. Thus, the system 105 may apply a weighting to each of the scores that are used to calculate an overall quality for the source text. An exemplary equation may include an overall quality Q is equal to $T_T+0.7(L_S)+0.4(L_G)+0.2(L_X)$, where $T_T$ is a translation trust score, $T_S$ is a statistical linguistic spelling score, $T_G$ is a statistical linguistic grammar score, and $T_X$ is a statistical linguistic syntax score.

According to some embodiments, the trust score may also correlate to an estimated translation cost for translating the source text. For example, a relatively low trust score may indicate that the source text will be difficult to translate. Contrastingly, a relatively high trust score may indicate that the source text will be more easily translated. In most instances, translation difficulty is strongly correlated to translation cost. Therefore, the lower the trust score, the higher the estimated translation cost for the source text. Estimated translation cost amounts may be determined by evaluating translation costs for translations of similar source texts relative to the subject source text.

In some instances, authors may set a threshold for which a trust score is high enough to use the machine translation. Again, machine translation is significantly more cost effective than human translation. However, this may not apply for all languages. So per language, authors may establish a cut off trust score, but combining many languages may make the cost drop off more fluent.

In some instances, the system 105 may provide suggestions for improving the translatability of the source text. If the source text is determined by the system 105 to have a relatively poor translatability, the system 105 may provide suggestions for altering the source text to improve the translatability of the source text. Advantageously, the system 105 may provide suggestions for increasing the trust score of the source text.

In some instances, an SMT may be trained automatically by collecting original "bad" sentences and corresponding final "good" sentences and using them as translation pairs. Such SMTs may be very useful to non-native writers because they tend to make the same set of mistakes. Additionally, subject matter experts tend not to be professional writers, increasing the likelihood of the content to contain mistakes.

Moreover, the source text is evaluated not only for translatability, but also for overall quality, using such linguistic metrics such as spelling, grammar, syntax, SEO quality, translation cost, and so forth, the system 105 may suggest improvements to the source text. These suggested improvements to the source text represent statistically relevant suggestions that lie at the intersection of various facets of statistical linguistic analysis methods conducted on the source text. Stated otherwise, suggestions for the source text that rank highly relative to each linguistic analysis method are highly likely to increase the overall quality of the source text.

The suggestions may transform a poorly structured sentence in a source language into a well-structured sentence in the source language that is likely to result in good translations, low translation costs, and high SEO values. Abstractly, the system 105 performs a "translation" of the source text from poorer quality content to higher quality content.

Returning to the example source texts of FIG. 2, the system 105 may provide suggestions for reducing the complexity of the second sentence 210 of source text to source text that more closely represents the first sentence 205 of source text.

In some instances, the suggestions may include proposed modifications to the source text obtained from an n-gram statistical model. An n-gram statistical model may be used to predict a suitable word for an n-gram (e.g., n-number of words) sentence. Thus, if the author provides a four word sentence, the n-gram model may "predict" one or more possible words that may be used as a fifth word for the sentence. The n-gram model may also be used to predict suitable alternatives for replacing words in the current sentence. The n-gram model may be used to select suggestions by finding similar word patterns that exist in a translation dictionary or a parallel corpus.

While an n-gram statistical model has been described, one of ordinary skill in the art will appreciate that other statistical translation models, such as hidden Markov models, n-tuple models, collocation, and so forth, may also likewise be used in accordance with the present technology.

Additionally, statistically relevant suggestions for source text improvement may also be determined for spelling, grammar, syntax, and other linguistic features which have been previously described. For example, the suggestions may comprise suggestions for replacing a misspelled word. The suggestion may also be obtained using an n-gram spelling model that allows the system 105 to choose the most statistically relevant replacement word for the sentence.

Statistically relevant suggestions for the source text may be utilized by the system 105 to improve not only the translatability of the source text, but also the overall quality of the source text relative to various qualities such as search engine optimization. For example, a source text which includes word with a spelling error may nevertheless be translated into a target language correctly. Unfortunately, the spelling error may affect the overall quality of the source text. Typos are not well received by consumers. Additionally, the system 105 may suggest that a properly translated word be replaced with a synonymous word or phrase because the suggested word or phrase is more advantageous for search engine optimization. In some instances, relevant suggestions that may improve the overall quality of a text may include replacing or conforming current to correspond to content that has a high statistical match with content previously reviewed as high quality and applicable to a target audience.

FIGS. 3A-F are exemplary user interfaces of an authoring environment. FIGS. 3A-F collectively illustrate an exemplary use case where source text is analyzed using one or more statistical linguistics analyzers.

Figure 3A:
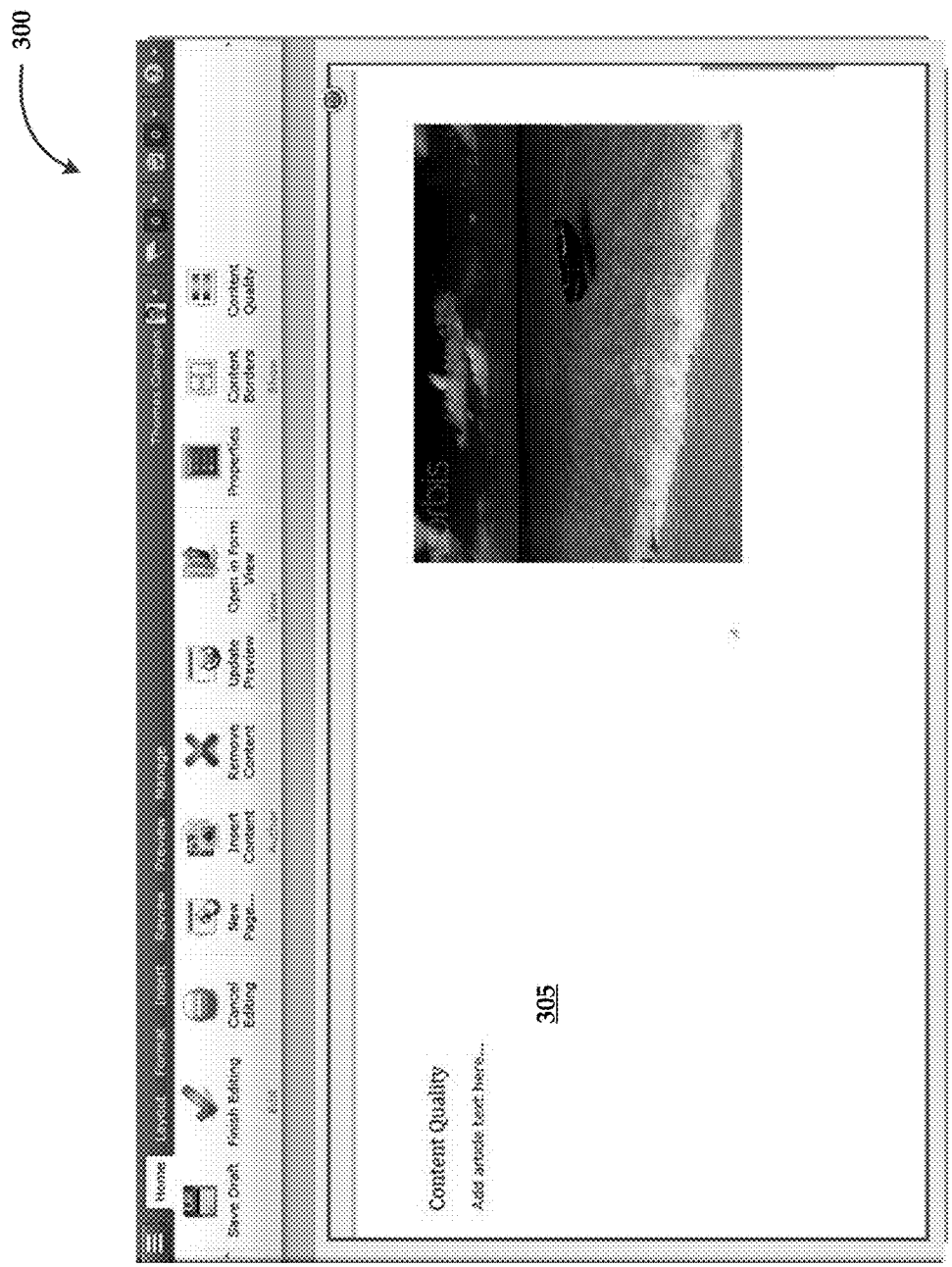
FIGS. 3A-F collectively illustrate the inputting of source text into an authoring environment, highlighting of the source text to reflect translatability and/or overall quality, displaying estimated translation costs, search engine optimization (SEO) suggestions, and SEO index values, and improving of the source text.

FIG. 3A illustrates an exemplary authoring environment 300 that includes a source text input window 305. The environment 300 may include a layout for an exemplary publication. The author may click within the window 305 and begin inputting source text.

Figure 3B:
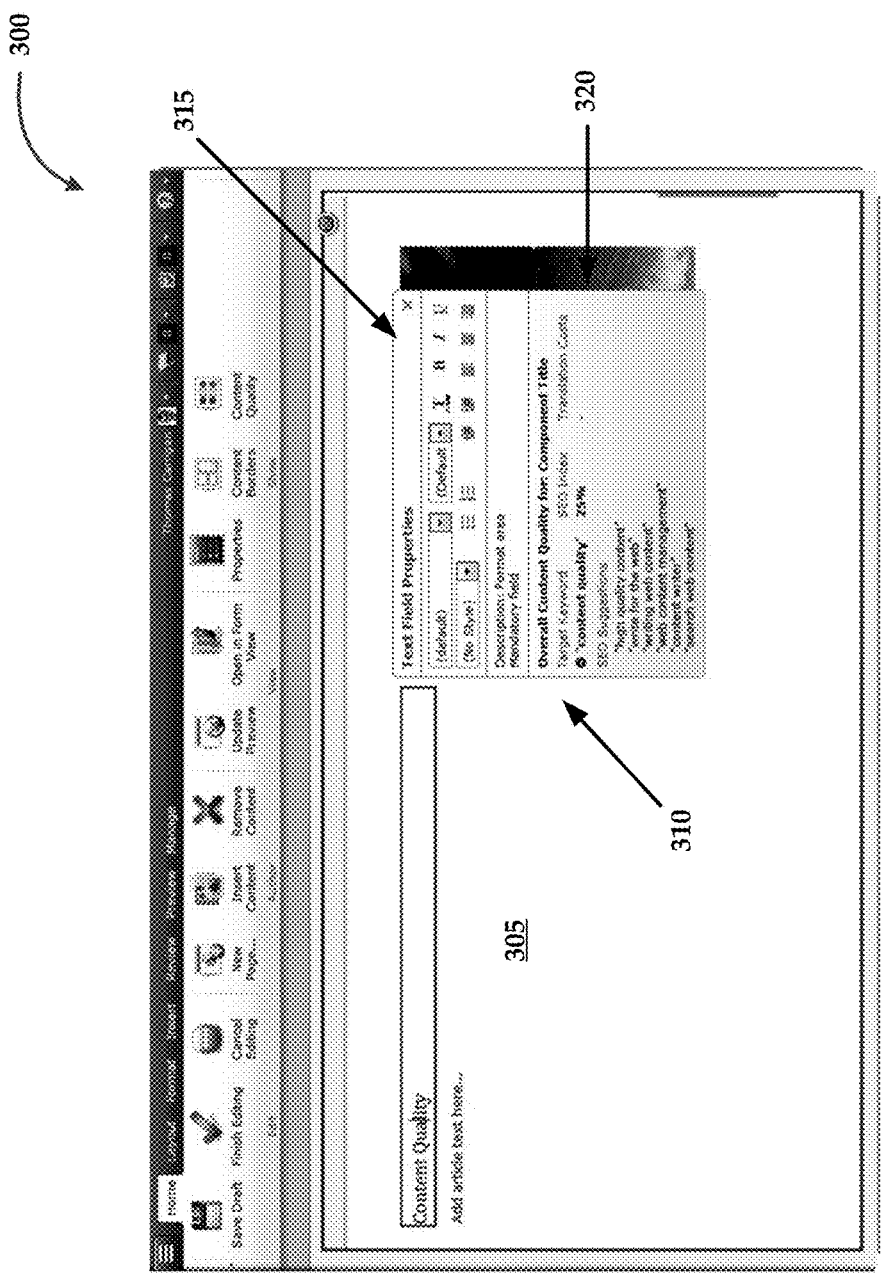

FIG. 3B illustrates the exemplary authoring environment 300 having the source text input window 305 and an exemplary field text properties panel 310. The panel 310 is shown as comprising a formatting palette 315 that allows the author to selectively modify the format of the source text, such as font, color, size, and so forth. The panel 310 may also comprise an overall content quality section 320. The overall content quality for the source text "content quality" included in the panel 310 includes an SEO index value of 25%, which indicates that the source text has a relatively low quality for SEO. To increase the SEO index value for the source text, the system 105 has generated a plurality of SEO suggestions that may be used to increase the SEO index value of the source text included in the window 305. A translation cost for the source text not been calculated or is not available.

Figure 3C:
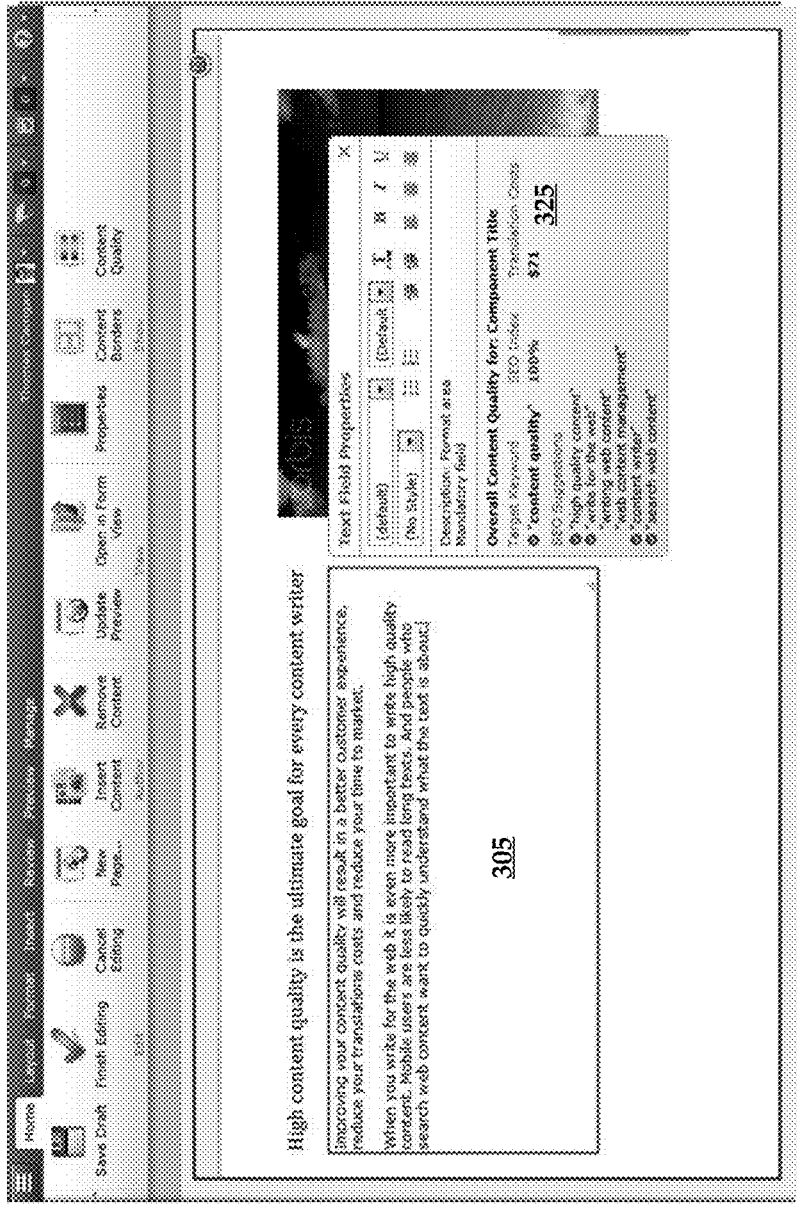

FIG. 3C illustrates several sentences of source text that have been typed into the window 305. With a change in source text, the translation cost 325 for the source text has increased to $71. It is also noteworthy to mention that many of the SEO suggestions have been incorporated into the source text, which has caused an increase in the SEO index value from 25% to 100%.

Figure 3D:
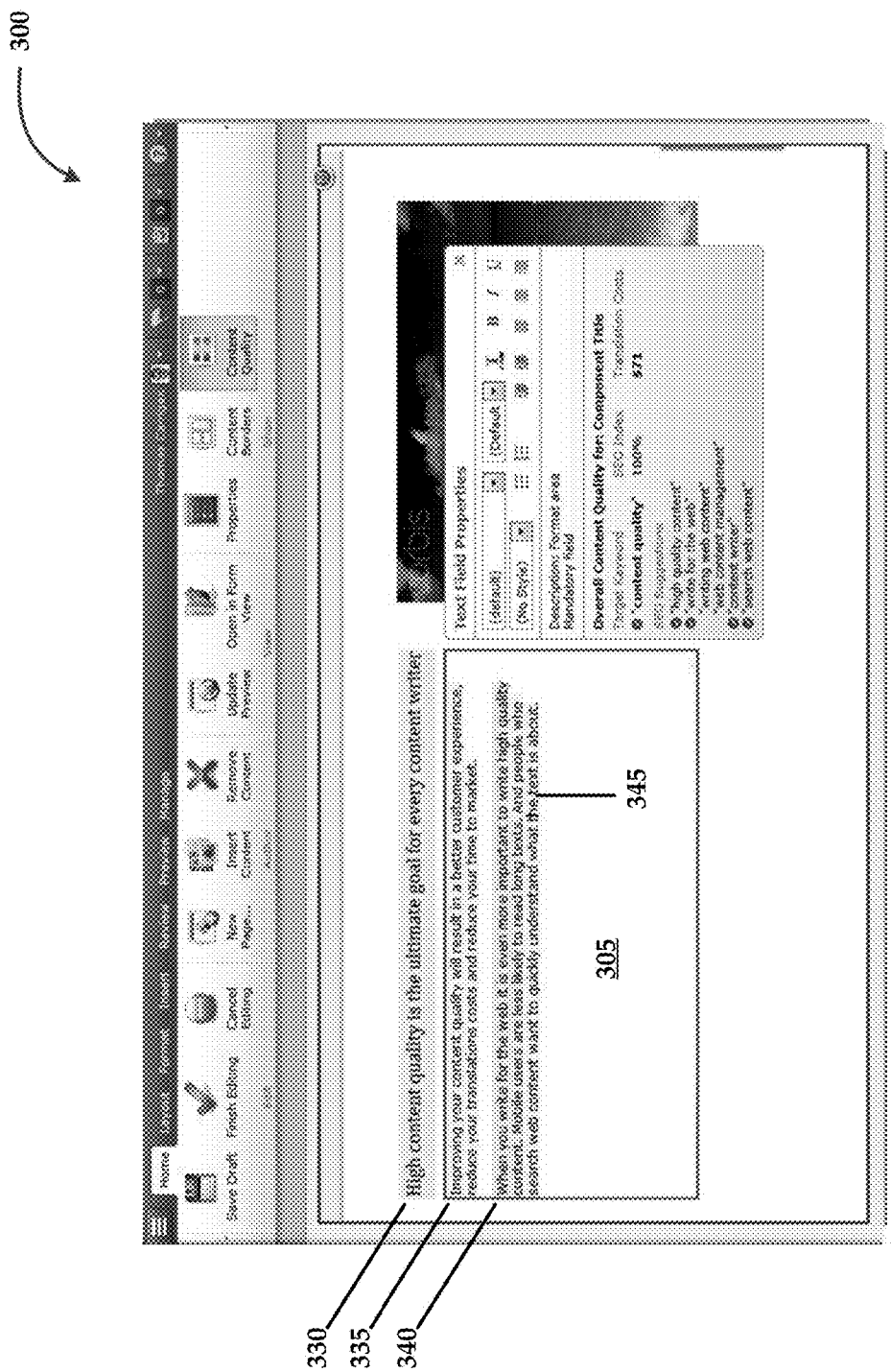

FIG. 3D illustrates highlighting of source text sentences included in the window 305 according to translatability determined for the various sentences of source text. For example, a first sentence 330 is highlighted with a color such as a dark green, which indicates that the first sentence 330 has high translatability or overall quality relative to other factors such as spelling, grammar, SEO value, and so forth. A second sentence 335 and a fourth sentence 345 are highlighted with a color such as a light yellow, which indicates that the translatability or overall quality of the second sentence and fourth sentences are relatively average. A third sentence 340 is highlighted with a color such as a dark yellow, which indicates that the third sentence 340 has a somewhat high translatability or overall quality relative to the second and fourth sentences.

Figure 3E:
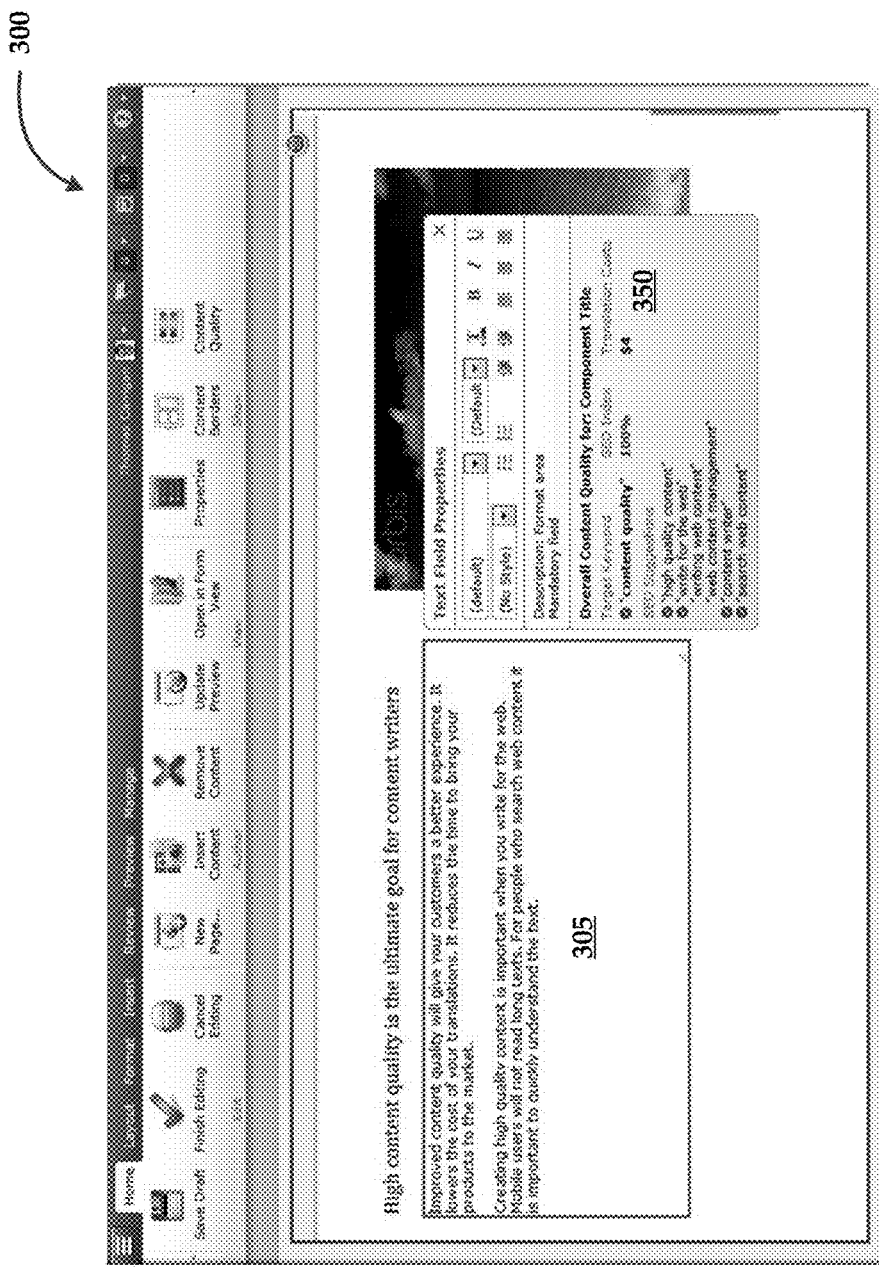

FIG. 3E illustrates an improvement in overall quality of the source text. The source text included in window 305 is shown as having an estimated translation cost 350 of $4, which represents a significant dropped relative to the translation cost of FIGS. 3C-D, which was $71.

Figure 3F:
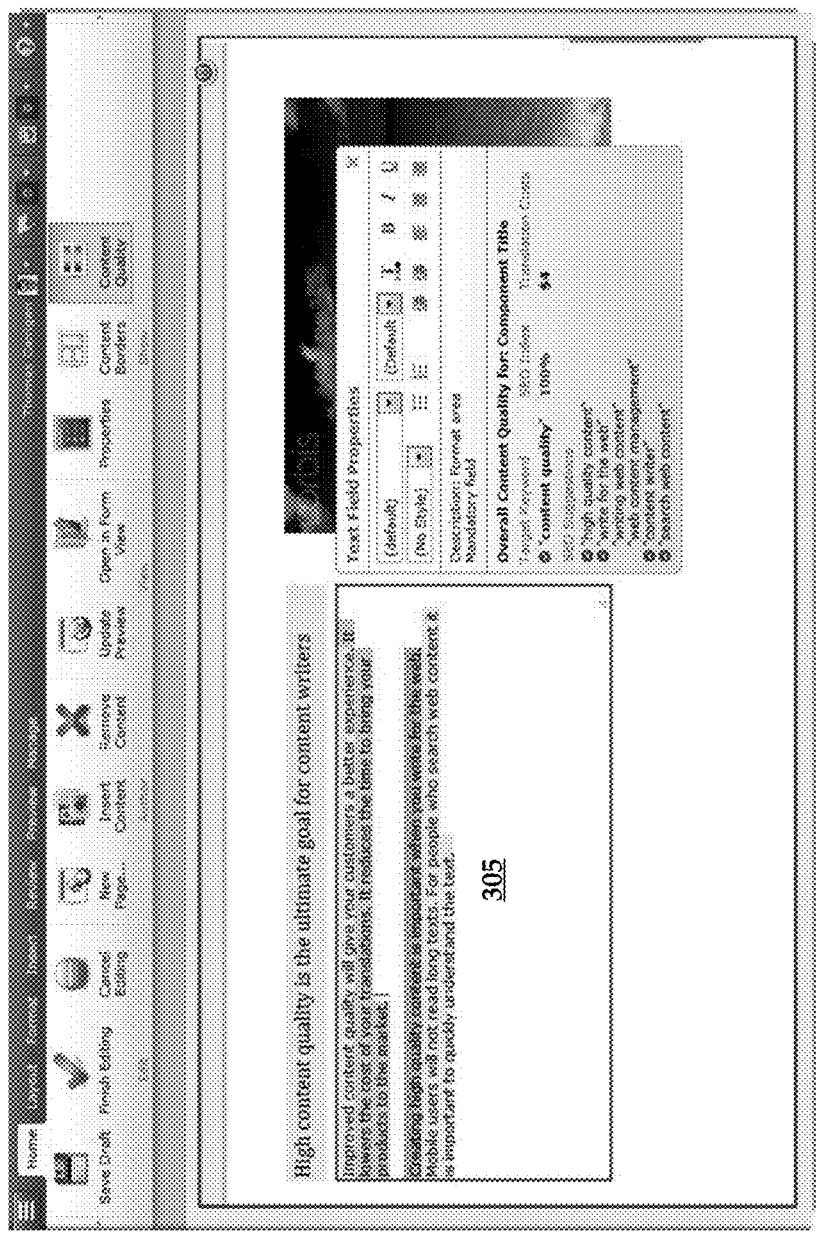

FIG. 3F illustrates an improvement in overall quality of the source text as illustrated by a change in the highlighting of the source text relative to the source text of FIGS. 3C-D. More specifically, all of the sentences of the source text included in the window 305 have been highlighted with a hue of green, indicating that each of the sentences has seen a measure of improvement in translatability and/or overall quality over the source text of FIGS. 3C-D.

In addition to the various statistical linguistic analysis methods described herein, the system 105 may also utilize one or more rule-based linguistic analysis methods, such as rule-based spelling analysis, syntax analysis, and so forth.

Figure 4:
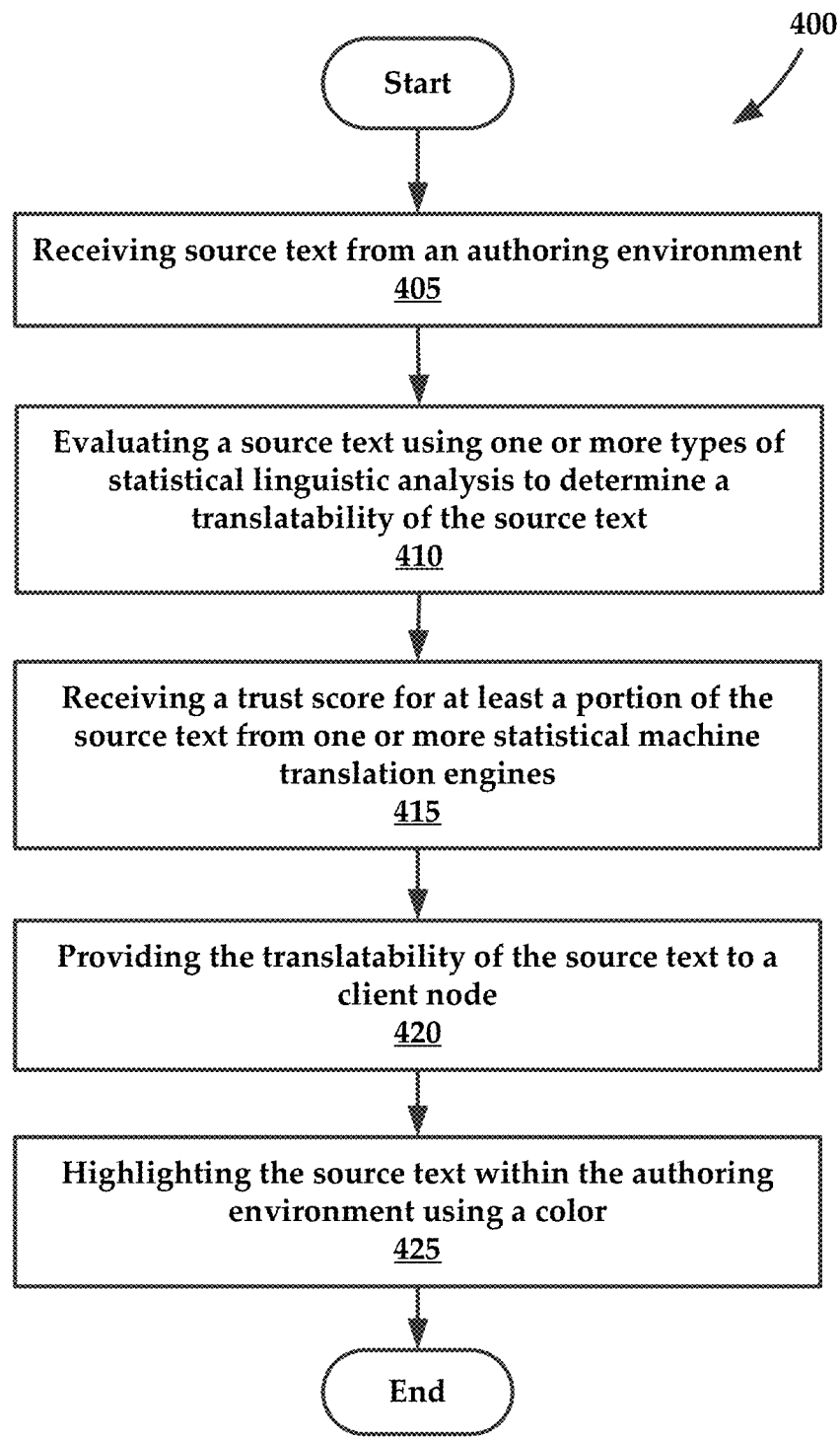
FIG. 4 is a flowchart of an exemplary method for improving source text.

FIG. 4 is a flowchart of an exemplary method 400 for improving the translatability of source text. The method 400 may comprise a step 405 of receiving source text from an authoring environment. The method 400 may also comprise a step 410 of evaluating a source text using one or more types of statistical linguistic analysis to determine a translatability of the source text.

According to some embodiments, the method 400 may comprise a step of 415 of receiving a trust score from one or more SMT engines. Again, the trust score may include a trust score, an average of a plurality of trust scores, a weighted average of a plurality of trust scores. Additionally, the trust score may be generated by a domain-specific SMT engine. The domain-specific SMT engine that is selected may or may not correspond to the domain associated with the source text.

In some embodiments, the method 400 may comprise a step 420 of providing the translatability of the source text to a client node. The client node may comprise a storage media (e.g., physical or virtual), an authoring environment, an end user computing device, a server, and so forth.

The method 400 may also comprise an optional step 425 of highlighting the source text within the authoring environment using a color, the color indicating the translatability and/or an overall quality of the source text, relative to various linguistic metrics such as spelling, grammar, syntax, as well as other non-linguistic features such as translation cost and SEO value.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
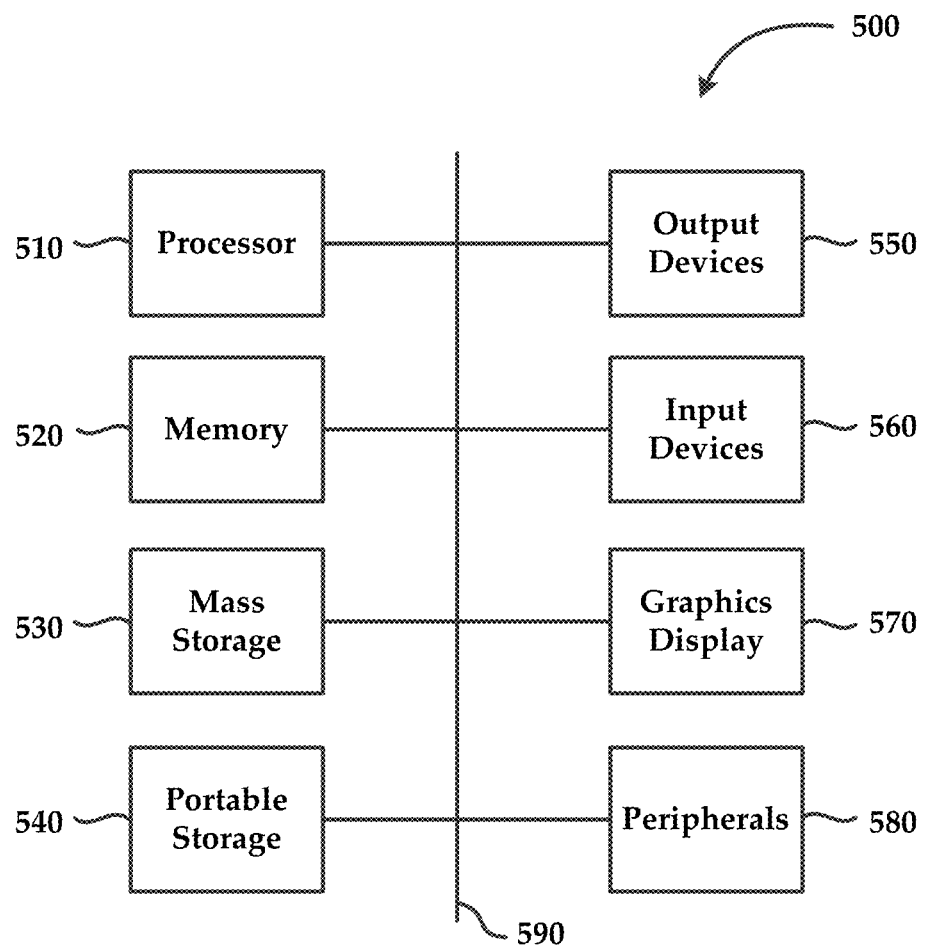
FIG. 5 is a block diagram of an exemplary computing system for implementing embodiments according to the present technology.

FIG. 5 illustrates an exemplary computing system 500 that may be used to implement an embodiment of the present technology. The computing system 500 of FIG. 5 may be implemented in the contexts of the likes of computing systems, networks, exchanges, servers, or combinations thereof disclosed herein. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components may be connected through one or more data transport means. Processor 510 and main memory 520 may be connected via a local microprocessor bus, and the mass storage device 530, peripheral device(s) 580, portable storage device 540, and graphics display 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripherals devices 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEP-ROM, any other memory chip or cartridge.

Computer program code for carrying out operations for aspects of the present invention may be written in any combination of one or more programming languages, including an object oriented programming language such as Java, Smalltalk, C#, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing dynamic feedback within an authoring environment to improve overall quality of text in real time, the method comprising:
receiving in the authoring environment a first source text from an author;
displaying, via a processor communicatively coupled with a memory, the first source text in the authoring environment;
calculating a first numerical value representing translatability of the displayed first source text, the calculation of the first numerical value performed in real time based on a first trust score generated using a statistical machine translation engine for translation of the displayed first source text;
displaying in the authoring environment a second source text related to the first source text in meaning and differing from the first source text;
calculating a second numerical value representing translatability of the second source text, the second numerical value calculated in real time based on a second trust score generated using the statistical machine translation engine for translation of the second source text;
visually enhancing the display of the first and second source text in the authoring environment in real time based on the first and second calculated numerical values to indicate to the author translatability of the respective visually enhanced first and second source text; and
replacing the first source text with the second source text to improve the overall quality of text in the authoring environment.

2. The method according to claim 1, further comprising, within an authoring environment interface, associating the first and second source text with the visual enhancement, which represents the translatability of the source text.

3. The method according to claim 1, further comprising one or more statistical machine translation engines to determine a quantification of quality of a translation of the first and second displayed source text.

4. The method according to claim 3, wherein each of the one or more statistical machine translation engines utilizes one or more domain-based parallel corpora.

5. The method according to claim 4, further comprising:
determining a domain for the first and second source text; and
receiving a trust score for the first and second source text from a statistical machine translation engine that utilizes a domain-based parallel corpus that corresponds to the domain of the first and second source text.

6. The method according to claim 1, further comprising:
generating the first trust score of the first source text using a statistical machine translation engine that utilizes a domain-based parallel corpus that does not correspond to the domain of the first source text; and
generating the second trust score of the second source text using the statistical machine translation engine that utilizes the domain-based parallel corpus.

7. The method according to claim 1, further comprising:
determining a domain for the first and second source text;
receiving a first plurality of trust scores for the first source text from a plurality statistical machine translation engines that each utilize a unique domain-based parallel corpus;
calculating the first numerical value representing translatability of the displayed first source text based on the first plurality of trust scores;
receiving a second plurality of trust scores for the second source text from the plurality statistical machine translation engines that each utilize the unique domain-based parallel corpus; and
calculating the second numerical value representing translatability of the displayed second source text based on the second plurality of trust scores.

8. The method according to claim 1, further comprising calculating the first and second numerical values representing translatability using a plurality of types of statistical linguistic analyzers that comprises one or more of a statistical grammar module, a statistical term module, a statistical spelling module, a statistical syntax module, a statistical style module, and combinations thereof.

9. The method according to claim 1, further comprising providing suggestions for improving the translatability of the first source text, the suggestions comprising proposed modifications to the first source text obtained from an n-gram statistical model.

10. The method according to claim 1, further comprising providing an estimated translation cost for the first and second source text.

11. A system, comprising:
at least one computing device comprising a memory that includes executable instructions and a processor executing the instructions to:
receive a first source text from an author at a client node;
display the first source text at the client node;
evaluate a first trust score representing translatability of the first source text using a plurality of types of statistical linguistic analysis, including a machine translation engine;
display a plurality of alternative source texts at the client node;
evaluate an alternative trust score for each of the plurality of alternative source texts, each of the alternative trust scores representing translatability of the respective alternative source text using the plurality of types of statistical linguistic analysis, including the machine translation engine;
enhance the first source text and each of the alternative source texts at the client node to reflect their respective translatability, based on the respective trust scores, the enhancement visually differentiating the first source text from the plurality of alternative source texts displayed within a same authoring environment, the first source text and each of the plurality of alternative source texts having varying translatability from one another; and replace the first source text with a selection of at least one of the plurality of alternative source texts from the author at the client node to improve overall quality of the source text.

12. The system according to claim 11, wherein the one or more types of statistical linguistic analysis comprises one or more statistical machine translation engines, wherein each of the one or more statistical machine translation engines utilizes one or more domain-based parallel corpora.

13. The system according to claim 12, wherein the processor further executes the instructions to:
   determine a domain for the source text; and
   receive the first trust score for the first source text and the alternative trust score for each of the alternative source texts, from a statistical machine translation engine that utilizes a domain-based parallel corpus that corresponds to the domain of the source text.

14. The system according to claim 11, wherein the processor further executes the instructions to:
   determine a domain for the source text; and
   receive the first trust score of the first source text and the alternative trust score of each of the alternative source texts, from a statistical machine translation engine that utilizes a domain-based parallel corpus that does not correspond to the domain of the source text.

15. The system according to claim 12, wherein the processor further executes the instructions to:
   determine a domain for the source text; and
   receive a plurality of trust scores for the first source text and a plurality of alternative trust scores for each of the plurality of alternative source texts from a plurality statistical machine translation engines that each utilize a unique domain-based parallel corpus.

16. The system according to claim 11, wherein the one or more types of statistical linguistic analysis further comprises one or more of a statistical grammar module, a statistical term module, a statistical spelling module, a statistical syntax module, a statistical style module, and combinations thereof.

17. The system according to claim 11, wherein the processor further executes the instructions to provide suggestions for improving the translatability of the first source text, the suggestions comprising proposed modifications to the first source text obtained from an n-gram statistical model.

18. The system according to claim 11, wherein the processor further executes the instructions to provide an estimated translation cost for the first source text and one or more of the alternative source texts.

19. The system according to claim 11, wherein the plurality of types of statistical linguistic analysis includes statistical machine translation used for quantification of quality of the displayed source texts in context of a source language, the statistical machine translation trained using a parallel corpus of sentence pairs in the source language of the displayed texts.

20. A method for providing dynamic feedback within an authoring environment to improve quality of text in real time, the method comprising:
   evaluating, via a processor communicatively coupled with a memory, a plurality of first trust scores for an authored source text received in the authoring environment from an author, the evaluation performed in real time using a plurality of domain-based statistical machine translation engines, the domain of each of the domain-based statistical machine translation engines being different from the domain of the authored source text, each of the first trust scores representing translatability of the authored source text using the respective domain-based statistical machine translation engine;
   calculating a first translatability value for the authored source text using the plurality of first trust scores;
   evaluating, via the processor communicatively coupled with the memory, a plurality of second trust scores for a suggested source text displayed in the authoring environment, the evaluation of the plurality of second trust scores for the suggested source text performed in real time using the plurality of domain-based statistical machine translation engines, each of the second trust scores representing translatability of the suggested source text using the respective domain-based statistical machine translation engine;
   calculating a second translatability value for the suggested source text using the plurality of second trust scores;
   visually enhancing display of the authored source text based on the calculated first translatability in the authoring environment to reflect quality of the authored source text in real time;
   visually enhancing display of the suggested source text based on the calculated second translatability value in the authoring environment to reflect quality of suggested source text in real time; and
   improving overall quality of the authored source text by replacing the authored source text in the authoring environment with the suggested source text.

* * * * *